Nov. 6, 1962 R. A. DAVIS ETAL 3,063,038

MAGNETIC CORE BINARY COUNTER

Filed Feb. 9, 1959 2 Sheets-Sheet 1

MAGNETIC CORE BINARY COUNTER
Filed Feb. 9, 1959 2 Sheets-Sheet 2
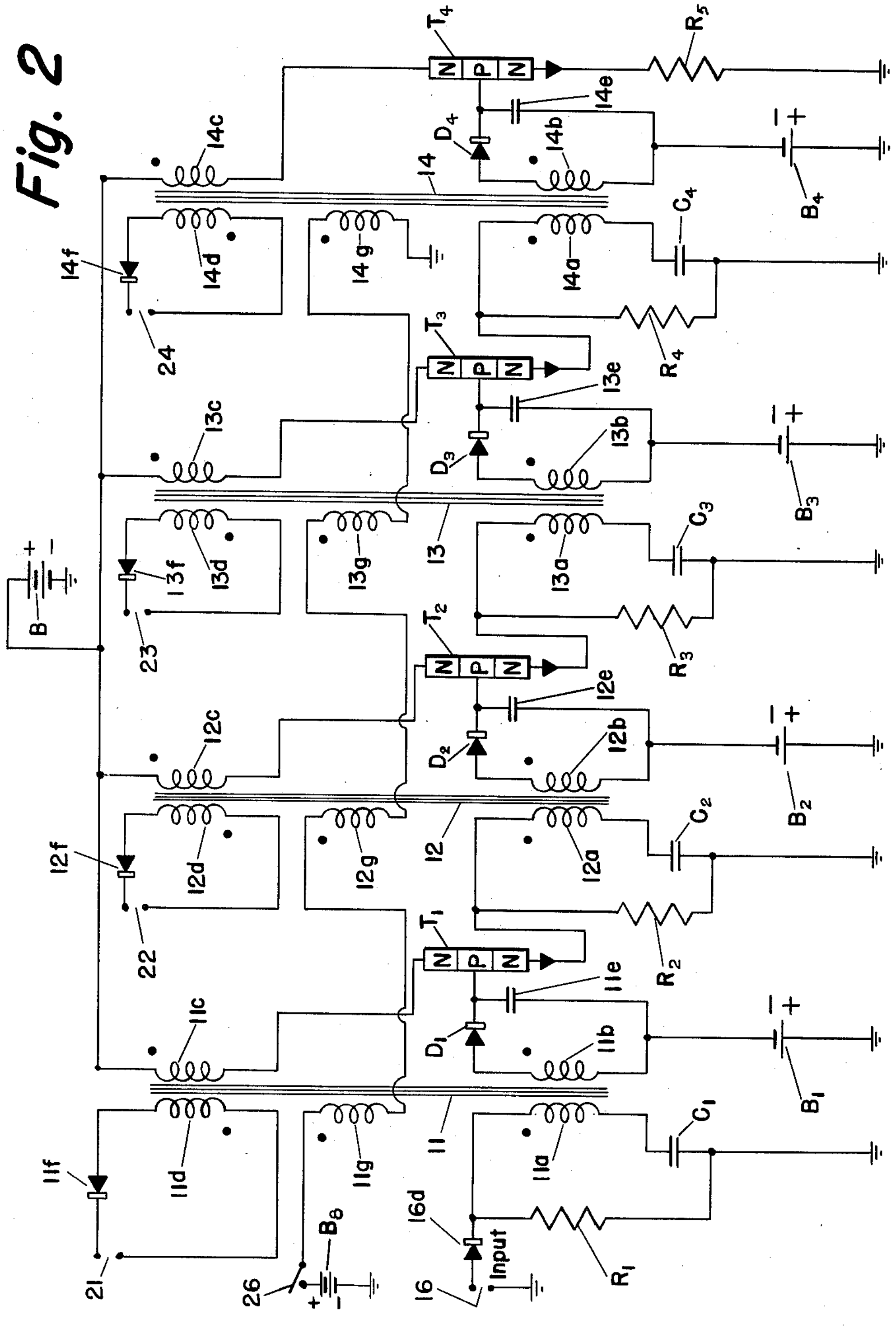

United States Patent Office 3,063,038

Patented Nov. 6, 1962

3,063,038
MAGNETIC CORE BINARY COUNTER

Roderic A. Davis, Poughkeepsie, and George E. Olson, Wappingers Falls, N.Y., assignors to International Business Machines Corporation, New York, N.Y., a corporation of New York Filed Feb. 9, 1959, Ser. No. 792,194
9 Claims. (Cl. 340—174)

This invention relates to logical circuits of the type useful in forming binary counters and shift registers and has for an object the provision of a reliable and novel arrangement of magnetic cores and switching devices for performing the counting operations in response to a succession of input pulses.

A binary trigger circuit may be defined as an elementary storage unit of a counter which may be placed in either of two stable states. In binary terminology, it is convenient to refer respectively to a first state as the "zero" state and to the second state as the "one" state.

While trigger circuits including magnetic cores have heretofore been utilized, it is an object of the present invention to provide a new cooperative arrangement between an electrical storage device, a magnetic core, and a switching device to form logical circuits including binary counters of any desired number of stages with but a single input circuit or drive-line connected to the first stage.

It is a further object of the invention to utilize semiconductors as the switching devices, thereby to provide both amplification and cancellation operations in circuits embodying the present invention.

It is a further object to provide a system of considerable flexibility including both parallel reset and parallel read-out for the cores.

It is a further object to provide logical circuits utilizing a minimum number of components and including but a single input circuit to the first stage, transistors being utilized for amplification and cancellation purposes in conjunction with magnetic cores driven to one or the other of two stable states in a predetermined combinatorial code.

In carrying out the present invention in one form thereof, a logical circuit such as a binary counter is comprised of a plurality of magnetic cores, each in its initial first stable state of magnetization. Input pulses are applied in succession to the input winding of the first of said cores. An electrical storage device, such as a capacitor, is included in the input circuit. Each input pulse as applied to the input winding has a polarity tending to produce said first state of magnetization. Since the core already has that state, no change is effected. However, the capacitor is charged and upon termination of the input pulse, the capacitor discharges to change the magnetization of said first core to its second state. When this occurs, an output is produced from an output winding. That output has a polarity which maintains an associated transistor non-conductive.

Since the first core is now in its second or "one" state, the next input pulse will return it to its first or "zero" state. The resultant output pulse then has a polarity of direction which turns on the transistor. This transistor, acting as a switching device applies an amplified pulse to an inhibit winding to bias the core to its first state thereby to prevent its operation to its second state upon discharge of the capacitor.

The input circuit to the second state includes the aforesaid transistor, a resistor, an input winding and a capacitor. Thus as the transistor is turned on, the input winding of the second stage is energized by the amplified pulse but the polarity is in a direction to maintain the second core in its first state. Upon discharge of its associated capacitor, charged by the amplified pulse, that core is switched to its second or "one" state.

Upon appearance of the third pulse, operations occur identical with those described above for the first pulse. It may now be observed that with the three pulses so far described there will have been produced operations which produce in the cores, states which in the binary system may be taken as representative of 1000, 0100, and 1100. Operations similar to the foregoing take place with each succeeding pulse applied to the single input circuit associated with the first stage. Thus, with but four cores, sixteen distinctively different combinations may be produced.

For further objects and advantages of the invention and for details of circuitry and operation, reference is to be had to the following description taken in conjunction with the accompanying drawings, in which:

FIG. 1 diagrammatically illustrates one embodiment of the invention;

FIG. 2 illustrates a further embodiment of the invention.

Figure 1:
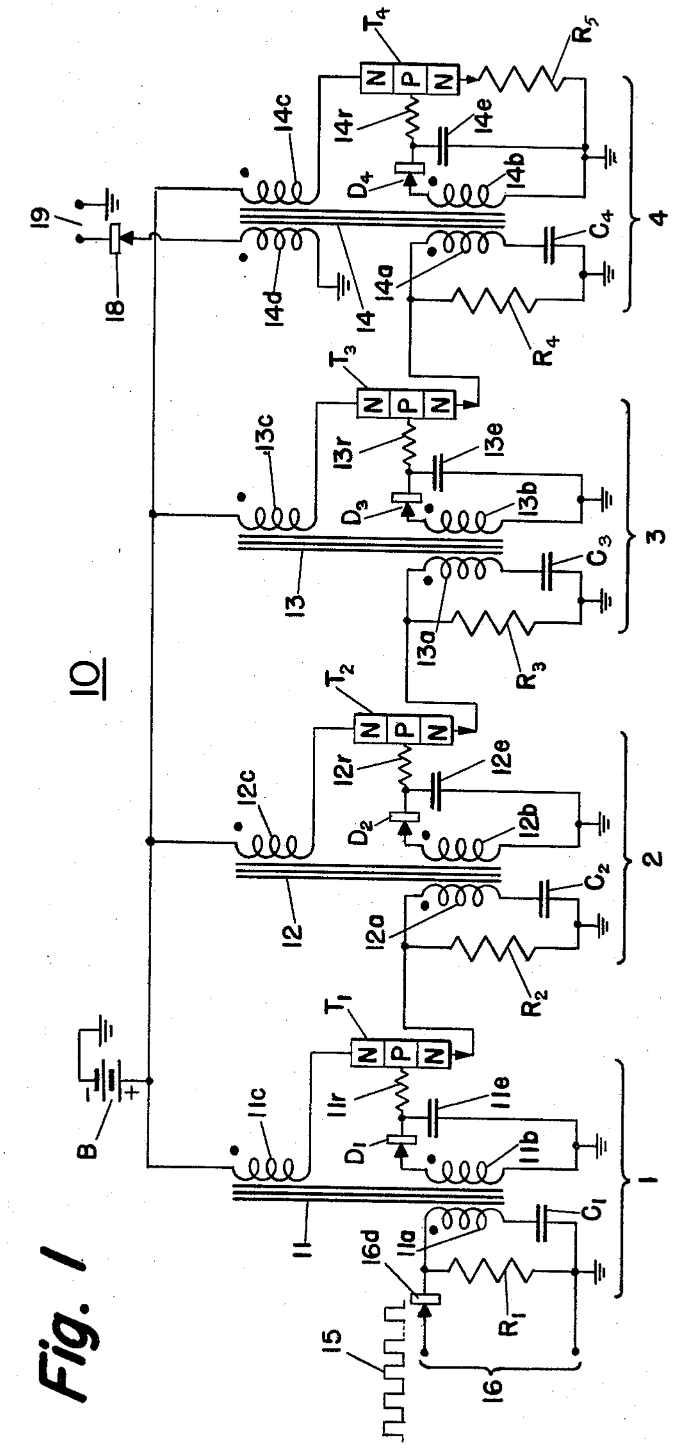
FIG. 1A is a hysteresis loop helpful to an understanding of the invention.
Figure 1A:
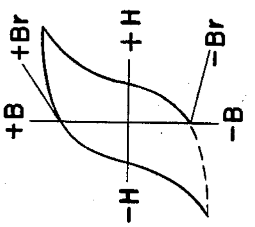

Referring to FIG. 1, the invention in one form has been shown as applied to a logical circuit in the form of a binary counter 10 having four stages 1–4. These stages respectively include magnetic elements or cores 11–14, each of a material providing substantially rectangular hysteresis loops. As shown in FIG. 1A, each core is capable of assuming one or the other of two different stable remanence conditions $-Br$ and $+Br$. The core 11 has an input winding **11*a*, a control winding 11*b* and an inhibit winding 11*c*. Cores 12–14 have like windings 12*a*–14*a*, 12*b*–14*b* and 12*c*–14*c*** respectively magnetically coupled thereto. Though each winding has been illustrated as including a plurality of turns, it is to be understood that a single conductor threaded throughout an opening in a magnetic core or otherwise magnetically coupled thereto is to be deemed a winding, since the magnetic field produced by current flow through a straight conductor can produce a magnetizing force upon a core of adequate magnitude to change it from one to the other of its stable states.

The cores 11, 12, 13 and 14 may be made of any of the magnetic materials heretofore found desirable for magnetic storage devices. For example, they may be made of 4–70 Mo-Permalloy, each core preferably consisting of a plurality of laminations, for example, as twenty of them. The input pulses 15 may be of a magnitude, such as provided with a 45-volt source in series with a 10-ohm resistor.

A resistor $R_1$ and a capacitor $C_1$ are included in series circuit relation with input winding **11*a*. Similarly, one of resistors $R_2$–$R_4$ and one of capacitors $C_2$–$C_4$ are respectively connected in series with one of input windings 12*a*–14*a*. Each of the latter circuits including input windings 12*a*–14*a* includes in series therewith one of transistors $T_1$–$T_3$. The control windings 11*b*–14*b* are respectively connected to transistors $T_1$–$T_4$ to turn them on and off. The transistors perform switching functions in their respective circuits which also respectively include inhibit windings 11*c*–14*c***.

Only one input circuit as at input terminals 16 need be provided for pulses 15 to be counted. The input to logical circuit 10 extends from input terminals 16 by way of a diode **16*d* to the junction between resistor $R_1$ and input winding 11*a***.

Referring now to FIG. 1A, the cores 11–14 of FIG. 1 when in one or the other of their stable remanent states, as at $-Br$ and $+Br$, can be taken as representative of the "zero" and the "one" comprising the notations for the bits used in the binary system.

Assuming now that all cores 11–14 are in their first or "zero" states as at $+Br$, FIG. 1A, and that the first of a plurality of the input pulses 15 is applied to the input terminals 16, the input winding **11*a* will be energized to produce on core 11 a magnetomotive force in a direction to bias that core to its first state. Since it is already in that state, no change from one, $+Br$, to the other, $-Br$, of its magnetization states will ocur. While there will be some change in the magnetic flux in core 11, it will be of a relatively low order with a resultant output pulse at control winding 11*b*** of relatively low amplitude and insufficient to turn on transistor $T_1$.

The input pulses 15, shown as positive-going pulses, are applied through diode **16*d* to the upper or "positive" end of winding 11*a*. This "positive" end of winding 11*a* is so indicated by the heavy black dot adjacent its upper end. Since this same input pulse induces a pulse in control winding 11*b*, a dot is placed adjacent the end which is thereby made positive. Thus the dot on the control winding 11*b* appears at the upper end of that winding. Thus the dots adjacent one or the other ends of the windings in FIGS. 1 and 2 indicate the disposition of the windings on each core. Since inhibit winding 11*c* is to produce magnetic forces which act on the core in the same direction as the forces produced by winding 11*a*, the upper end of winding 11*c*** bears the dot-symbol.

The first of input pulses 15 applied to the circuit including the input winding **11*a* and the capacitor $C_1$ in one branch, and the resistor $R_1$ in the other branch, though it does not switch core 11, is effective to charge the electrical energy storage device shown as capacitor $C_1$. As soon as that first input pulse disappears, the capacitor $C_1$ discharges through input winding 11*a* and resistor $R_1$. The flow of current through winding 11*a*, in the reverse direction to that produced by the input pulse, develops a magnetizing force on core 11 which changes or switches it from its first $+Br$ or "zero" state to its second $-Br$ or "one" state. Thus for the first pulse, cores 11–14** have states corresponding in the binary system to 1000.

With the switching of core 11 from its first to its second state, a negative output pulse is developed at the upper end of winding **11*b*. This pulse has a polarity which tends to make the base of transistor $T_1$ negative relative to its emitter. Accordingly, transistor $T_1$ is not turned on, that is, rendered conductive, when core 11** is switched from its first state to its second state. Moreover, the diode $D_1$ is connected in the input circuit to transistor $T_1$ and poled with a polarity to block the negative-going pulses.

With core 11 in its "one" or $-Br$ state, it will now be assumed that the second input pulse is applied to input terminals 16. The resultant flow of current through the winding **11*a* is in a direction to switch the core 11 from its second $-Br$ state to its first state, with a resultant development at control winding 11*b* of a positive-going output pulse. This output pulse charges capacitor 11*e* and makes the base of transistor $T_1$ positive relative to its emitter. This turns on transistor $T_1$ with a resultant flow of current from a source shown as battery B. Thus the transistor $T_1$ produces an amplified pulse through the inhibit winding 11*c* in direction such that the resultant magnetic forces tend to maintain core 11** in its zero or $+Br$ state.

As transistor $T_1$ is turned on, the amplified current pulse is also applied to input winding **12*a* and to the capacitor $C_2$ of the second stage 2. The capacitor $C_2$ thereby acquires a charge. Similar to the action of the first pulse, the flow of current through winding 12*a*, due to an applied pulse, is in a direction which biases core 12 to its first or "zero" state. Thus, there is no change in the magnetic state of core 12** when transistor $T_1$ is turned on though a change occurs when transistor $T_1$ is turned off.

Returning now to stage 1, upon disappearance upon winding **11*a* of the second pulse, capacitor $C_1$ again discharges through winding 11*a* with the development upon core 11 of a magnetizing force again tending to switch it from its first $+Br$ state to its second $-Br$ state. The core 11, however, remains in its first state due to the magnetic bias on that core resulting from the energization of inhibit winding 11*c*. This result is achieved by reason of the charge acquired by capacitor 11*e* when transistor $T_1$ was turned on. That charge on capacitor 11*e* maintains transistor $T_1$ conductive during discharge of capacitor $C_1$. Thus the core 11 is not switched by the discharge of capacitor $C_1$ following the disappearance of the pulse which turned on transistor T. The time constants of the discharge circuits for capacitors $C_1$ and 11*e* through their associated resistors $R_1$ and 11*r* are of the same order, preferably equal, to assure the foregoing operation. In this connection, the resistor 11*r* may be omitted with an appropriate change in the size of capacitor 11*e* to provide the desired time constant for its discharge circuit through transistor $T_1$ and resistor $R_2$. The resistor 11*r* is shown to illustrate the manner in which the amplified impulse from control winding 11*b* may be attenuated to a desired value in the event the change in flux cutting winding 11*b* produces a pulse of undesired large amplitude. A reduction in amplitude of the output pulse from control winding 11*b* may be attained by reducing the cross-section of core 11 or where winding 11*b* comprises more than a single conductor, by reducing its number of turns or magnetic coupling with core 11**.

By reason of capacitor **11*e*, the transistor $T_1$ remains conductive for a period corresponding with that required for the discharge of capacitor $C_1$. After discharge of capacitor $C_1$, transistor $T_1$, by reason of the disappearance of the charge on capacitor 11*e*, is turned off. The diode $D_1$ blocks discharge of capacitor 11*e* through control winding 11*b*** to assure the above-described operation.

When transistor $T_1$ is turned off, the capacitor $C_2$ discharges through winding **12*a* and resistor $R_2$ with the resultant development on core 12 of a magnetomotive force of magnitude adequate to switch core 12** from its first $+Br$, or "zero" state to its second $-Br$ or "one" state. Thus for the second pulse, the cores in the binary system are representative of 0100.

The system is now in condition for the application of the third pulse. That third pulse produces the same operations as the first pulse since core 11 was, by the second pulse, returned to its first $+Br$, or "zero" state. Accordingly, after discharge of capacitor $C_1$ as a result of the third pulse, the core 11 is again switched to its second $-Br$ or "one" state. Accordingly, the states of magnetization of the cores 11–14 then represent in the binary system 1100.

With cores 11 and 12 in their second $-Br$, or "one" states, the fourth pulse is effective first to switch core 11 to its $+Br$, or "zero," state. The output from control winding **11*b* turns on transistor $T_1$ which again functions to prevent a change of state of core 11** upon later discharge of capacitor $C_1$.

The output from transistor $T_1$ is applied through input winding **12*a* to switch core 12 from its $-Br$ or "one" state to its $+Br$ or "zero" state. This develops from control winding 12*b* an output which is applied to transistor $T_2$ to turn it On. Capacitor 12*e* is at that time charged. With transistor $T_2$ turned on, the inhibit winding 12*c* is energized and so is the input circuit to the third stage including core 13. The flow of current through winding 13*a* is in a direction to bias it to its first state. That current also charges capacitor $C_3$. When transistor $T_2$ is turned off as a result of termination of the fourth pulse, capacitor $C_3$ discharges to switch core 13 to its "one" or $-Br$ state. Thus for the fourth pulse, the cores 11–14** in the binary system have magnetic states representative in the binary system of 0010.

The foregoing operations are repetitious in character. Thus the fifth pulse functions in a manner identical to the first pulse to switch core 11 to its "one" state, while the sixth pulse functions in the same manner as the second pulse to return core 11 at its "zero" state and to switch core 12 to its "one" state. The seventh pulse, like the first pulse, switches core 11 to its "one" state. Thus for the fifth, sixth and seventh pulses, the magnetic states of the cores 11–14 are respectively representative of 1010, 0110 and 1110.

Upon appearance of the eighth pulse, the cores 11, 12 and 13 are switched to their "zero" states in the same manner as occurred upon application of the fourth pulse, and the core 14 is switched to its "one" state. The operations above described are again repeated. The sequence as a whole has been represented in Table I for the four cores and for the application of sixteen pulses.

*Table I*

| Pulse No. | Cores 11 | 12 | 13 | 14 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |
| 16 | 0 | 0 | 0 | 0 |

Upon the appearance of the sixteenth pulse, it will be noted that all of cores 11–14 are switched from their $-Br$ or "one" states to their $+Br$ or "zero" states. Since core 14 for the sixteenth pulse is for the first time switched from its $-Br$ or "one" state to its $+Br$ or "zero" state, an output from stage 4 corresponding with the foregoing change in magnetization state will be indicative of the completed count of sixteen by the four stages of FIG. 1. Accordingly, there is provided on core 14 an output winding **14*d*, with a dot-symbol at its upper end, which winding produces an output pulse for an output circuit including a diode 18. The diode 18 prevents appearance at output terminals 19 of a pulse developed on output winding 14*d* upon switching of core 14 from its "zero" to its "one" state, as occurred upon application of the eighth pulse, but passes to the output terminals 19** the output pulse developed by the change of states occurring only upon application of the sixteenth pulse.

It will be understood that the output circuit from terminals 19 may be utilized to energize a second counter and may also be used for other types of utilization circuits as will be understood by those skilled in the art.

Though transistors of the PNP type may be utilized with corresponding changes in polarity of the sources, and though the values of the circuit components are not critical and may be changed materially without sacrifice of performance of the system as a whole, a typical set of values for the circuit components has been given in the following table which is to be taken as exemplary of values found useful in a typical embodiment of the invention:

*Table II*

$R_1$–$R_4$=1000 ohms
$C_1$–$C_4$=.01 microfarad
$R_{11r}$–$R_{14r}$=10,000 ohms
$C_{11e}$–$C_{14e}$=.001 microfarad
Source B=18 volts
$T_1$–$T_4$=NPN alloy junction type
Cores 11–14=Sprague type 31Z18

Features of the system of FIGS. 1 and 2 may be utilized in/or omitted from embodiments of the invention.

For example, mention has been made of the omission of resistors **11*r*–14*r* from FIG. 1. These resistors do not appear in the system of FIG. 2. To safeguard operation against noise each transistor may include a source of bias voltage in its input circuit of polarity biasing the transistor to its non-conductive state. Such sources, of one-half volt magnitude, have been shown in FIG. 2 as bias batteries B1–B4. As well understood by those skilled in the art, either the $+Br$ state or the $-Br$ state may be taken to be representative of "zero" in the binary system and the other state to be representative of "one." Similarly the input and output circuits of the transistors may be conventional. Thus the input circuit may extend between the collector and base instead of between the collector and emitter, as shown in FIGS. 1 and 2. The diodes $D_1$–$D_2$, as explained above, and diode 16*d*** isolate the charging circuits of the respective capacitors $C_1$–$C_4$ from their discharge circuits. Similar isolation or polarity discrimination is provided by the corresponding diodes of FIG. 2.

Referring now to FIG. 2, the system of FIG. 1 has been shown with output windings **11*d*–14*d* respectively associated with the cores 11–14. Also coupled to the respective cores 11–14 are reset and read-out windings 11*g*–14*g*. With the addition of an output winding for each core, output circuits may be connected to each stage as by output terminals 21–24. Included in the respective output circuits are diodes 11*f*–14*f* poled or connected to provide output pulses whenever a core is changed from its "zero" state to its "one" state. Thus the diodes prevent passage of pulses when the top of each winding is negative, as in switching from a "one" to a "zero" state. Thus the dot-symbols appear at the lower end of windings 11*d*–14*d***.

The additional windings are to be taken as exemplary of the flexibility of the present invention in its application to circuits of various types.

By means of the windings **11*g*–14*g*, additional operations are readily provided. A pulse of short duration applied as from a source $B_8$ through a high-speed switching device, but for simplicity shown as a conventional switch 26, will be simultaneously effective upon all of the cores 11–14**. If that pulse be of polarity to switch to its "zero" state each core then in its "one" state, the result will be the switching from its "zero" to its "one" state each core following the one switched by said pulse from its "one" to its "zero" state. In this manner the "ones" are transferred from one stage to the next, thus meeting the requirements of a shifting register. The applied pulse from source $B_8$ will be positive-going with the windings having the indicated disposition or direction of turns on the cores.

As an example of the foregoing operations, it will be assumed that cores 12 and 14 are in their "zero" states and that cores 11 and 13 are in their "one" states. A pulse now applied to windings **11*g* and 14*g* will produce magnetic forces on cores 11 and 13 in directions to switch them to their "zero" states. Like forces are applied to cores 12 and 14 but since they are already in their "zero" states $+Br$, FIG. 1A, no change of state occurs. The cores 11 and 13 are switched to their "zero" states however. When so changing their states from $-Br$ to $+Br$, FIG. 1A, windings 11*b* and 13*b* turn on transistors $T_1$ and $T_3$. The inhibit windings 11*c* and 13*c* are thereby energized and capacitors $C_2$ and $C_4$ are charged. As the applied pulse disappears these capacitors are effective, as above described, to switch cores 12 and 14** to their "one" states. In this manner, the "ones" have each been advanced a stage.

Besides the shift-register operation, parallel read-out with reset is achieved by applying from source $B_8$ a pulse of longer duration. As an example, it will again be assumed that cores 12 and 14 are in their "zero" state and that cores 11 and 13 are in their "1" state. The pulse of longer duration will reset cores 11 and 13 to their zero states without switching by operation of the energy storing devices or capacitors $C_2$ and $C_4$ of cores 12 and 14 since each storage device or capacitor upon receiving a charge, due to the change in flux in the cores 11–14, begins to lose that charge through its discharge circuit as soon as steady state conditions obtain. Accordingly, the reset impulses will have a duration sufficiently long to permit capacitors $C_1$–$C_4$ to discharge their acquired charges to values below those effective to switch the cores 12 and 14 from their "zero" states to their "one" states.

With the above understanding of the invention it will be understood that many further variations may be made for adaptation in logic circuits of many kinds, and that certain features may be used without other features, all within the scope of the appended claims. For example, additional output windings like winding **14*d* of FIG. 1 may be provided for each of the cores of the embodiment of FIG. 2 together with diodes so that an output from each core will be obtained when switched from a "one" states to a "zero" state. Similarly, the cores of FIG. 1 may be provided with output windings 11*d*–14*d* and diodes 11*f*–14*f*** poled like those of FIG. 2 for production of an output pulse each time a core is switched from a "zero" state to a "one" state. Obviously all cores may have one or more output windings of each type and in number as may be needed to meet the requirements of particular logic systems.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A logical circuit comprising a plurality of magnetic elements each having two stable magnetic states, separate input and control windings magnetically coupled to each said element,
means including an electrical energy storage device connected in series circuit relation with each said input winding,
means including a resistor forming a discharge circuit for each said storage device in series with its associated input winding,
means including an input circuit for applying to a first of said input windings input pulses acting in direction to switch said element from a second to a first of said stable states and to charge said storage device, said storage device discharging through said discharge circuit upon disappearance of said input pulse for producing a current flow through said input winding in a direction to develop a magnetizing force to change said element from one to the other of its two stable states,
isolating means connected between each said discharge circuit and each said input circuit for preventing flow of current from each said storage device to each input circuit,
means including a transistor for each said element, each said transistor having an input circuit including a control winding of its associated element and having an output circuit including at least the input winding of another of said elements, each said input circuit to said transistors having connected therewith energy storing means for regulating the time-duration of a control signal applied to that input circuit, and
output means including an output winding magnetically coupled to at least one of said elements for developing an output signal when its element is switched from one to the other of its two stable states.

2. The logical circuit of claim 1 in which for each said magnetic element said energy storing means includes a discharge circuit having a time constant of the same order of magnitude as the time constant of said discharge circuit of the associated storage device.

3. The logical circuit of claim 2 in which each said discharge circuit of said energy storing means includes a resistor connected between said energy storing means and the associated transistor and in which
each said input circuit to said transistors has connected therewith a diode for blocking pulses produced when its magnetic element is switched from its first to its second state and for blocking discharge of said energy storing means through its associated control winding.

4. A logical circuit comprising
a magnetic element having a first and a second stable remanent magnetic state,
separate input, control and inhibit windings magnetically coupled to said element,
input means including an input circuit for said input winding for applying input pulses thereto, each said input pulse being in a direction to develop by said input winding a magnetizing force tending to change said element to its first state from its second state,
said input circuit including an electrical storage device for receiving electrical energy from each said input pulse and in giving up the stored energy upon termination of said input pulse producing current flow through said input winding in a direction to develop a magnetizing force tending to change said element to its second state from its first state,
a transistor in circuit with said inhibit winding for controlling the energization thereof to produce thereby a magnetizing force on said element in a direction to prevent change of said element from its first to its second state, and
a control circuit for said transistor including said control winding, said transistor being rendered conductive by said control winding upon change of state of said element to its first state from its second state for energization of said inhibit winding thereby to prevent said element from changing from its first to its second state upon discharge of said electrical storage device,
said control circuit including a capacitor for maintaining said transistor conductive for a time interval at least as great as the time required for discharge of said energy of said electrical storage device.

5. The logical circuit of claim 4 in which there is provided a diode connected between said transistor and said control winding and poled to block discharge of said capacitor through said control winding.

6. The logical circuit of claim 4 in which there is provided a discharge circuit for said electrical storage device including said input winding and excluding said input means.

7. The logical circuit of claim 4 in which there are provided a plurality of like magnetic elements and associated windings and circuits, the transistor associated with each said element including a connection to the input winding of a succeeding element for applying an input pulse thereto each time said switching device produces energization of its associated inhibit winding, whereby said magnetic elements are successively switched between their first and second magnetic states as said input pulses are sequentially applied to the input winding associated with a first of said elements.

8. The logical circuit of claim 4 in which said control circuit includes attenuating means to assure that said transistor is not rendered conductive by the output of said control winding upon application to said input winding of a pulse tending to change said element to its first state from its second state during the time said element already is in its first state.

9. The logical circuit of claim 7 in which said attenuating means comprises a diode and a resistor in series circuit relation.

References Cited in the file of this patent

UNITED STATES PATENTS

| | | |
|---|---|---|
| 2,763,780 | Skelton | Sept. 18, 1956 |
| 2,847,659 | Kaiser | Aug. 12, 1958 |
| 2,866,178 | Lo | Dec. 23, 1958 |
| 2,902,609 | Ostroff | Sept. 1, 1959 |
| 2,911,626 | Jones | Nov. 3, 1959 |
| 2,930,029 | Moore | Mar. 22, 1960 |
| 2,955,264 | Kihn et al. | Oct. 4, 1960 |
| 2,970,293 | Eckert | Jan. 31, 1961 |
| 2,991,457 | Hoffman et al. | July 4, 1961 |

UNITED STATES PATENT OFFICE
CERTIFICATE OF CORRECTION

Patent No. 3,063,038 November 6, 1962

Roderic A. Davis et al.

It is hereby certified that error appears in the above numbered patent requiring correction and that the said Letters Patent should read as corrected below.

Column 9, line 1, for the claim reference numeral "7" read -- 8 --.

Signed and sealed this 14th day of May 1963.

(SEAL)
Attest:

ERNEST W. SWIDER
Attesting Officer

DAVID L. LADD
Commissioner of Patents